United States Patent [19]

Ogawa

[11] Patent Number: 5,335,031
[45] Date of Patent: Aug. 2, 1994

[54] APPARATUS FOR CHANGING THE SIZE OF THE PHOTOGRAPHING APERTURE IN A CAMERA

[75] Inventor: Yuji Ogawa, Tokyo, Japan

[73] Assignee: Asahi Kogaku Kogyo Kabushiki Kaishi, Tokyo, Japan

[21] Appl. No.: 17,182

[22] Filed: Feb. 12, 1993

[30] Foreign Application Priority Data

Feb. 12, 1992 [JP] Japan .............................. 4-005258[U]
Feb. 13, 1992 [JP] Japan .............................. 4-005504[U]

[51] Int. Cl.⁵ ............................................ G03B 17/02
[52] U.S. Cl. .................................................. 354/159
[58] Field of Search .............. 354/94, 222, 195.12, 354/159

[56] References Cited

U.S. PATENT DOCUMENTS 5,010,357 4/1991 Misawa .

FOREIGN PATENT DOCUMENTS 447347  5/1936 United Kingdom .
859126  1/1961 United Kingdom .
2235542  3/1991 United Kingdom .
2244144 11/1991 United Kingdom .
2254704 10/1992 United Kingdom .

Primary Examiner—David M. Gray
Attorney, Agent, or Firm—Sandler, Greenblum & Bernstein

[57] ABSTRACT

An apparatus for changing a size of an aperture which defines a photographing aperture in a camera includes a pair of light intercepting plates which can cover a predetermined width of end edges of the aperture to partly intercept light incident thereupon, and an association mechanism which moves the light intercepting plates in association with each other between a retracted position in which the aperture is fully opened and a restricted-size position in which the aperture is partly intercepted. The association mechanism is comprised of a shaft secured to a camera body, and a connecting rotatable member which is rotatably mounted to the shaft. The connecting rotatable member is connected at one end thereof to one of the light intercepting plates and at the other end thereof to the other light intercepting plate, respectively, so that the rotation of the connecting rotatable member causes the associated movement of the light intercepting plates between the retracted position and the restricted-size position.

16 Claims, 6 Drawing Sheets

APPARATUS FOR CHANGING THE SIZE OF THE PHOTOGRAPHING APERTURE IN A CAMERA

BACKGROUND OF THE INVENTION

1. Field of the Invention

The present invention relates to an apparatus for changing the size of a photographing aperture in a camera, for example, from a standard size to a panoramic size, or a half size and vice versa, and it also relates to an apparatus for protecting light intercepting plates incorporated therein

2. Description of Related Art

There are known cameras in which the size of a photographing aperture can be varied. To change the photographing aperture size, it is known to provide rotatable light intercepting plates which are rotated about an axis to vary the photographing aperture size. This known mechanism for changing the photographing aperture size, however, requires a large space in which the light intercepting plates are rotatably accommodated, which prevents construction of a compact and small camera.

It is also known to provide an adaptor type of light intercepting plate which is detachably attached to an aperture frame that defines an aperture. It is, however, troublesome to attach and detach the adaptor to and from the aperture frame. The adaptor cannot be inserted or removed once the film is loaded into the camera, therefor the size of the photographing aperture cannot be changed. Furthermore, it is necessary for a photographer to inconveniently carry the adaptor which may easily be lost.

In conventional cameras having a photographing aperture whose size is variable, the size of the photographing aperture can be changed when a back cover of the camera is opened. The photographing aperture size thus changed is retained regardless of the open or closed state of the back cover. The light intercepting plates, which are provided in the vicinity of the aperture frame; are retractably moved or exposed into the aperture to partly cover the aperture to thereby change the photographing aperture size from a standard size (full size) to a size other than the standard size, for example, a panoramic size. Consequently, when the back cover is open, there is a possibility that the light intercepting plates are damaged or broken by an accidental touch of a photographer's finger, etc., therewith. One solution to prevent the light intercepting plates from being damaged or broken is to reinforce the light intercepting plates themselves or a drive mechanism thereof. This solution, however, leads to a big and heavy photographing aperture size varying apparatus which requires a larger accommodation space, thus resulting in a big and heavy camera.

SUMMARY OF THE INVENTION

The primary object of the present invention is to provide a simple photographing aperture size changing apparatus which requires less accommodation space.

To achieve the object mentioned above, according to the present invention, there is provided an apparatus for changing a size of an aperture which defines a photographing aperture in a camera, including a pair of light intercepting plates which can cover a predetermined area of the aperture to partly intercept light incident thereupon, and an association mechanism which moves the light intercepting plates in association with each other between a retracted position in which the aperture is fully opened and a restricted-size position in which the aperture is partly restricted. The association mechanism is comprised of a shaft secured to a camera body, and a connecting rotatable member which is rotatably mounted to the shaft. The connecting rotatable member is connected at one end thereof to one of the light intercepting plates and at the other end thereof to the other light intercepting plate, respectively, so that the rotation of the connecting rotatable member causes the associated movement of the light intercepting plates between the retracted position and the restricted-size position.

With this structure, since a pair of light intercepting plates are moved, or slid in association with each other through a connecting rotatable plate between a standard-size position (retracted position) and a restricted-size position other than the standard-size position, the photographing aperture size changing apparatus can be thin as a whole.

Another object of the present invention is to provide a protection apparatus which protects light intercepting plates incorporated in a photographing aperture size changing apparatus from being damaged or broken without adding size or weight to the camera.

To achieve the object mentioned above, according to the present invention, there is provided an apparatus for protecting light intercepting plates in a photographing aperture size changing apparatus in a camera with a back cover, including a pair of light intercepting plates which are movable between a retracted position in which an aperture of the camera is fully opened and a restricted-size position in which the aperture is partly restricted. A photographing aperture size changing mechanism is provided which changes the size of a photographing aperture defined by the movement of the light intercepting plates between the retracted position and the restricted-size position. A returning mechanism which drives the photographing aperture size changing mechanism to move the light intercepting plates to the full size position in association with the movement of the back cover when the latter is opened, is provided.

The present disclosure relates to subject matter contained in Japanese Utility Model Application Nos. HEI04-5258 (filed on Feb. 12, 1992) and HEI04-5504 (filed on Feb. 13, 1992) which are expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 1:
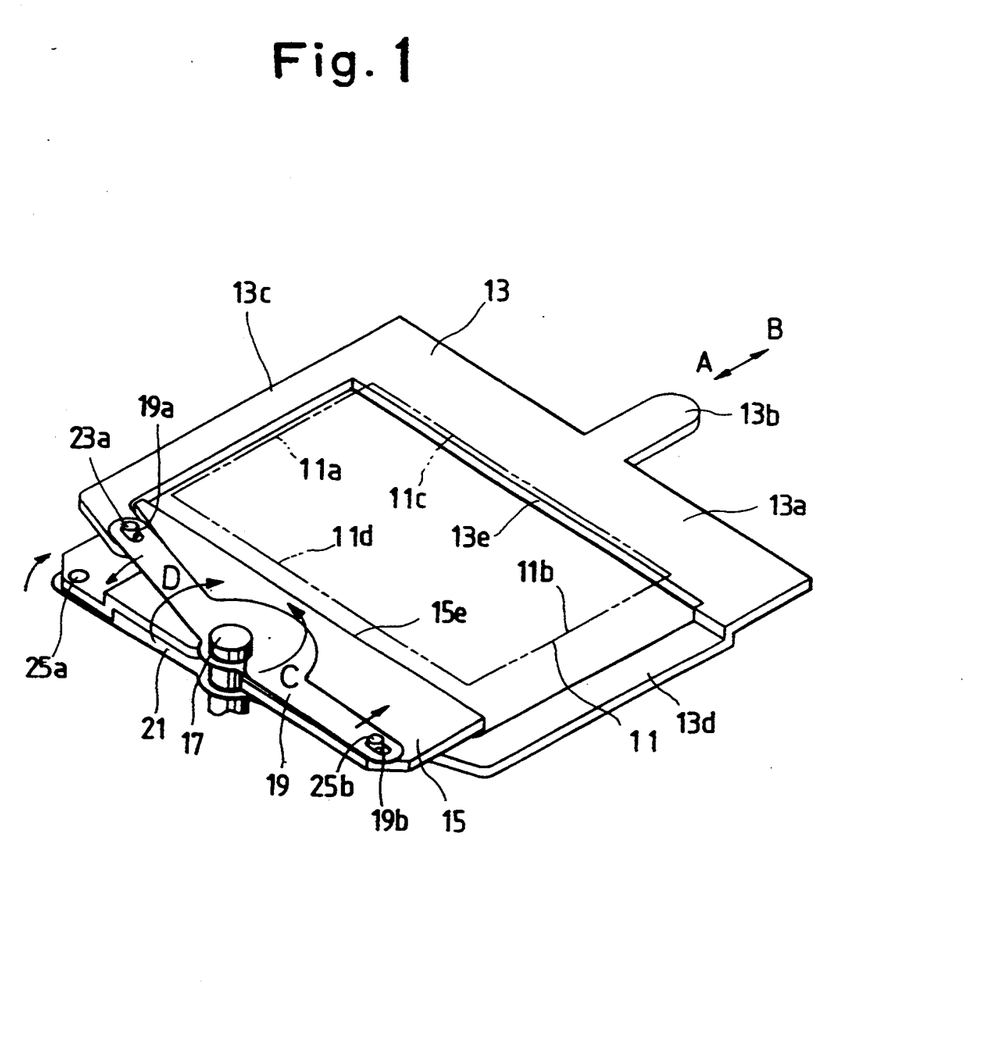
FIG. 1 is an isometric view of light intercepting plates in a photographing aperture size changing apparatus, shown in a retracted position, according to a first embodiment of the present invention.
Figure 2:
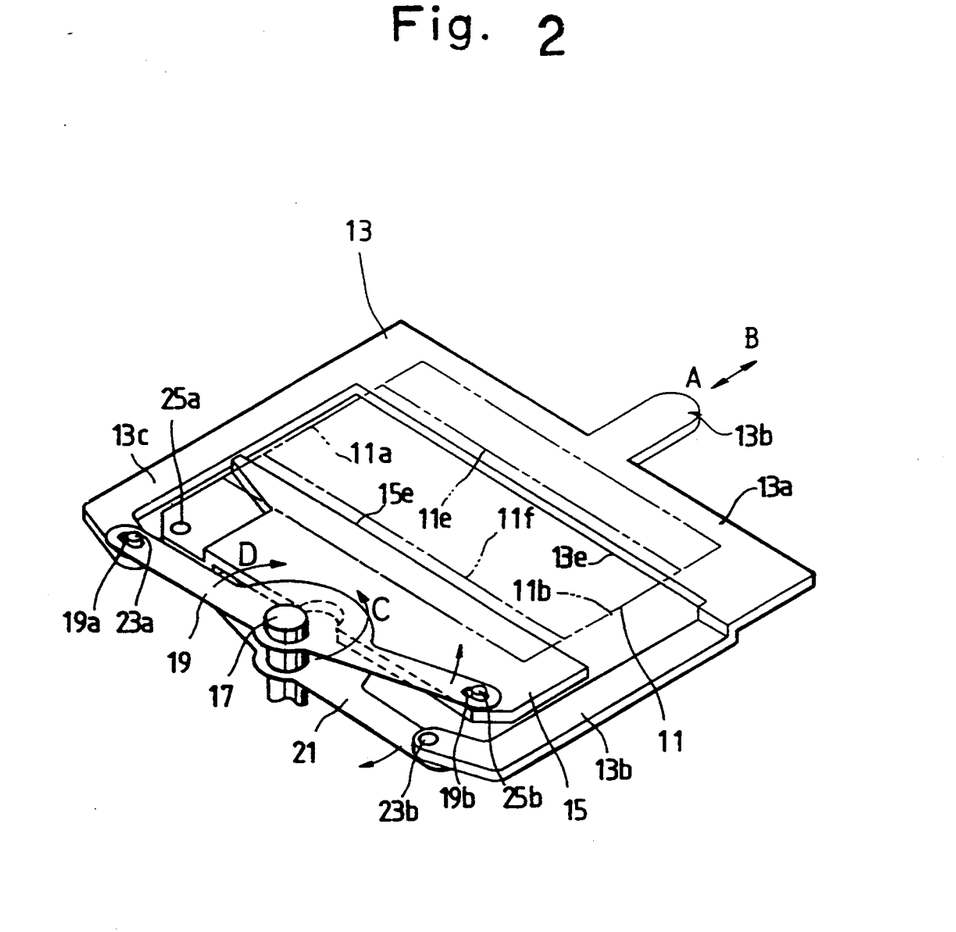
FIG. 2 is an isometric view of light intercepting plates in a photographing aperture size changing apparatus, shown in a panoramic-size position, according to a first embodiment of the present invention.

FIGS. 1 and 2 show a first embodiment of a photographing aperture size changing apparatus according to the present invention, shown in a retracted position and a panoramic-size position, respectively. The photographing aperture size changing mechanism includes a pair of light intercepting plates 13 and 15 which partly cover a predetermined area of upper and lower edges of an aperture 11 in the vicinity of upper and lower aperture frames 11c and 11d to define a panoramic size of photographing aperture. The first light intercepting plate 13 is substantially U-shaped in configuration and has a light intercepting portion 13a which is provided on the center portion thereof, with an operation projection 13b which extends in a direction opposite to the aperture 11. The light intercepting portion 13a is provided on opposite ends thereof with a pair of spaced association arms 13c and 13d which extend in parallel with each other in a direction opposite to the operation projection 13b. The distance defined by the opposed inner edges of the association arms 13c and 13d is larger than the distance (lateral width) between left and right aperture frames 11a and 11b so as not to intercept light incident in the aperture 11.

The second light intercepting plate 15 is generally rectangular and has a lateral width (length) larger than the distance (lateral width) between the left and right aperture frames 11a and 11b. The light intercepting portion 13a of the first light intercepting plate 13 and the second light intercepting plate 15 lie, and are movable in a same plane which is parallel to a film plane.

The light intercepting plates 13 and 15 are connected to each other by a pair of connecting rotatable plates 19 and 21 so as to move away from and towards each other. The rotatable plates 19 and 21 are rotatably mounted to a common shaft 17 which is secured to a camera body (not shown) in a substantially X-shaped configuration. The first connecting rotatable plate 19 is provided on opposite ends thereof with elongated holes 19a and 19b extending in a radial direction towards the shaft 17. The second connecting rotatable plate 21 is also provided on opposite ends thereof with elongated holes (not shown) similar to the elongated holes 19a and 19b.

The association arm 13c of the first light intercepting plate 13 has an inwardly projecting front end which is provided on an upper surface thereof with a first association pin 23a. On the other hand, the other association arm 13d of the first light intercepting plate 13 has an inwardly projecting front end which is provided on a lower surface thereof with a second association pin 23b. The first association pin 23a is fitted in the elongated hole 19a of the first connecting rotatable plate 19. The second association pin 23b is fitted in the other elongated hole (not shown) of the second connecting rotatable plate 21, respectively.

The second light intercepting plate 15 is provided, on a lower surface of one of the lateral ends thereof, with a second association pin 25a and on an upper surface of the other lateral end thereof, with a first association pin 25b, respectively. The second association pin 25a is slidably fitted in one of the elongated holes of the second connecting rotatable plate 21. The first association pin 25b is slidably fitted in the other elongated hole 19b of the first connecting rotatable plate 19, respectively. The association pins 23a, 23b, 25a and 25b are located at an equal distance from the common shaft 17 when they are fitted in the corresponding elongated holes, so that the pair of light intercepting plates 13 and 15 can be moved lo at a same speed (i.e., by a same distance) while keeping a parallel arrangement therebetween.

In the first embodiment illustrated in FIGS. 1 and 2, to reduce the size and thickness of the whole light intercepting mechanism, the association arms 13c and 13d of the first light intercepting plate 13 are inwardly bent at the front ends thereof, as mentioned before. Furthermore, to prevent the bent ends of the association arms 13c and 13d from interfering with the second light intercepting plate 15, the associated end of the latter is offset in the direction of the thickness thereof from the bent end of the association arm 13c, and the association arm 13d is wholly offset in the direction of the thickness thereof from the second light intercepting plate 15, respectively.

When the first light intercepting plate 13 is slid in a direction indicated by "A", the first connecting rotatable plate 19, associated with the first association pin 23a, is rotated in the direction indicated by "C", and the second connecting rotatable plate 21, associated with the second association pin 23b, is rotated in the direction indicated by "D", respectively. Conversely, when the first light intercepting plate 13 is slid in a direction indicated by "B", the first connecting rotatable plate 19, associated with the first association pin 23a, is rotated in the direction indicated by "D", and the second connecting rotatable plate 21, associated with the second association pin 23b, is rotated in the direction indicated by "C", respectively. Namely, the first and second connecting rotatable plates 19 and 21 are rotated in opposite directions in association with the slide movement of the first light intercepting plate 13.

The photographing aperture size changing apparatus, as constructed above, is provided in a camera in the vicinity of the aperture of the camera. The shaft 17 is secured to the camera body, as mentioned above, and the association arms 13c and 13d of the first light intercepting plate 13 are slidably guided by respective guide members (not shown) in the same plane. The projection 13b projects out of the camera body, so that it can be externally actuated.

The photographing aperture size changing apparatus of the present invention operates as follows:

When the first light intercepting plate 13 is slid in the direction A (panoramic direction) from the retracted position shown in FIG. 1, the first and second connecting rotatable plates 19 and 21 are rotated in the C and D directions, respectively, as mentioned before. As a result, a movement parallel to the movement of the first light intercepting plate 13, of the second light intercepting plate 15, takes place to move towards the first light intercepting plate 13, since the elongated hole 19b of the first connecting plate 19 and one of the second connecting plate 21 are moved towards the light intercepting portion 13a. Thus, a predetermined displacement of the first light intercepting plate 13 causes the first and second light intercepting plates 13 and 15 to move towards each other, so that a predetermined area of upper and lower edges of the aperture 11 is intercepted by the first and second light intercepting plates 13 and 15. Namely, the size of the aperture is reduced and defined by the opposite edges 13e and 15e of the light intercepting plates 13 and 15. Consequently, a panoramic-size photographic aperture, defined by the aperture frames 11a, 11e, 11b and 11f, is formed, as shown in FIG. 2.

Conversely, when the first light intercepting plate 13 is slid in the direction B, the first and second light intercepting plates 13 and 15 are moved away from each other in accordance with a mechanical association in a direction opposite to that mentioned above. Consequently, the first and second light intercepting plates 13 and 15 move beyond the upper and lower edges 11c and 11d of the aperture 11 to open the aperture. Namely, a full-sized photographing aperture, as shown in FIG. 1 is again formed.

Although the change of the photographing aperture size is effected by a manual operation of the projection 13b, by a photographer, in the illustrated embodiment, the present invention is not limited thereto. Any types of operation mechanisms causing a slide movement of the first and second light intercepting plates 13 and 15 can be adopted in the present invention. For instance, a modified arrangement shown in FIGS. 3 through 6 which will be discussed below, can be used. Furthermore, the operation projection 13b can be replaced with a slidable rotatable swingable or push-in type operation member.

A thin, light and simple photographing aperture size changing apparatus, according to the first embodiment of the present invention illustrated in FIGS. 1 and 2, requires only a very small accommodation space, owing to a planar movement of the light intercepting plates and the association mechanism thereof.

Although the above discussion has been directed to the change in size of the photographing aperture between the full size and the panoramic size, the present invention can be applied to any combination of large and small sizes, for example, a combination of a full size and a high-vision size having a photographing aperture ratio of 16:9 or a half-sized photographing aperture, etc. Although there are two connecting rotatable plates in the illustrated embodiment, it is also possible to provide a single connecting rotatable plate instead.

As can be seen from the above discussion, according to the present invention, since a pair of light intercepting plates are moved in association with each other through a pair of connecting rotatable members, a thin and small photographing aperture size changing apparatus, which does not require a large accommodation space, can be obtained, thus resulting in a contribution to a production of a compact camera.

Figure 3:
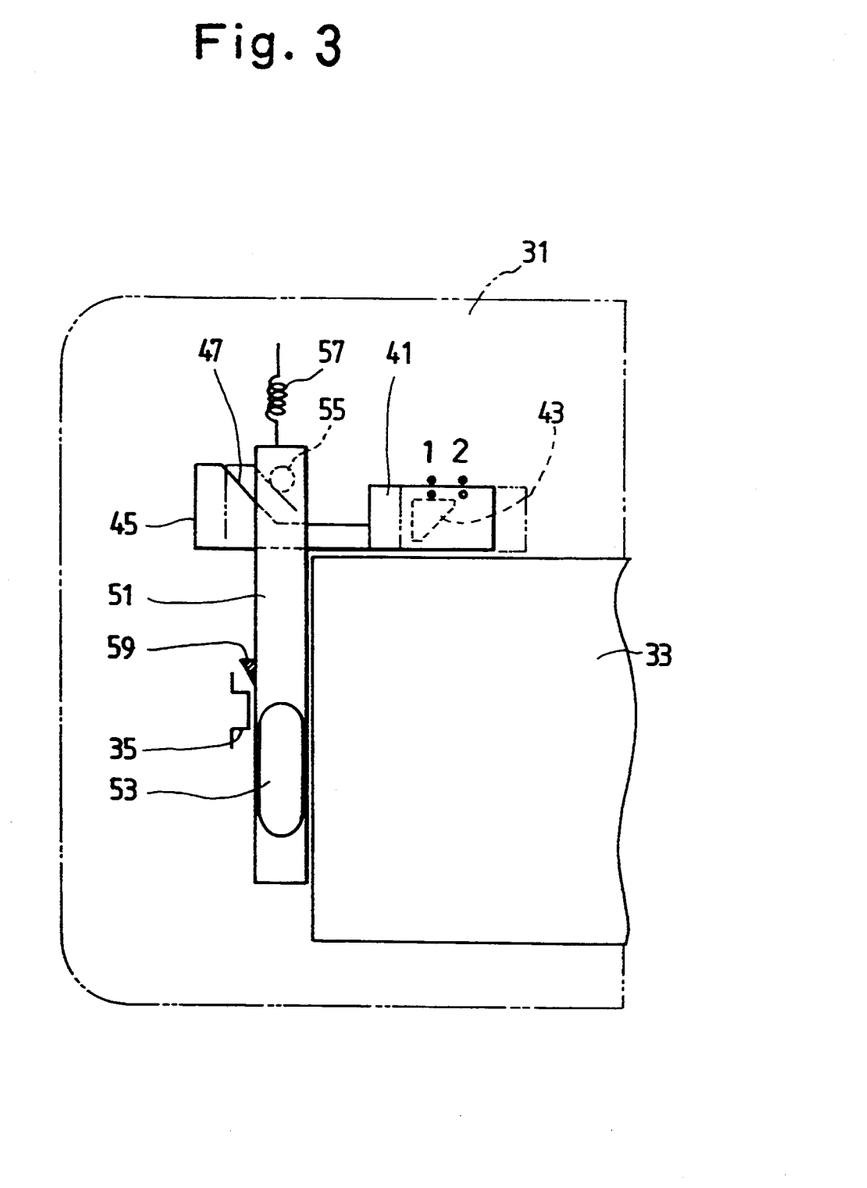
FIG. 3 is a back view of a main part of a camera having a light intercepting plate protecting apparatus according to the present invention.
Figure 4:
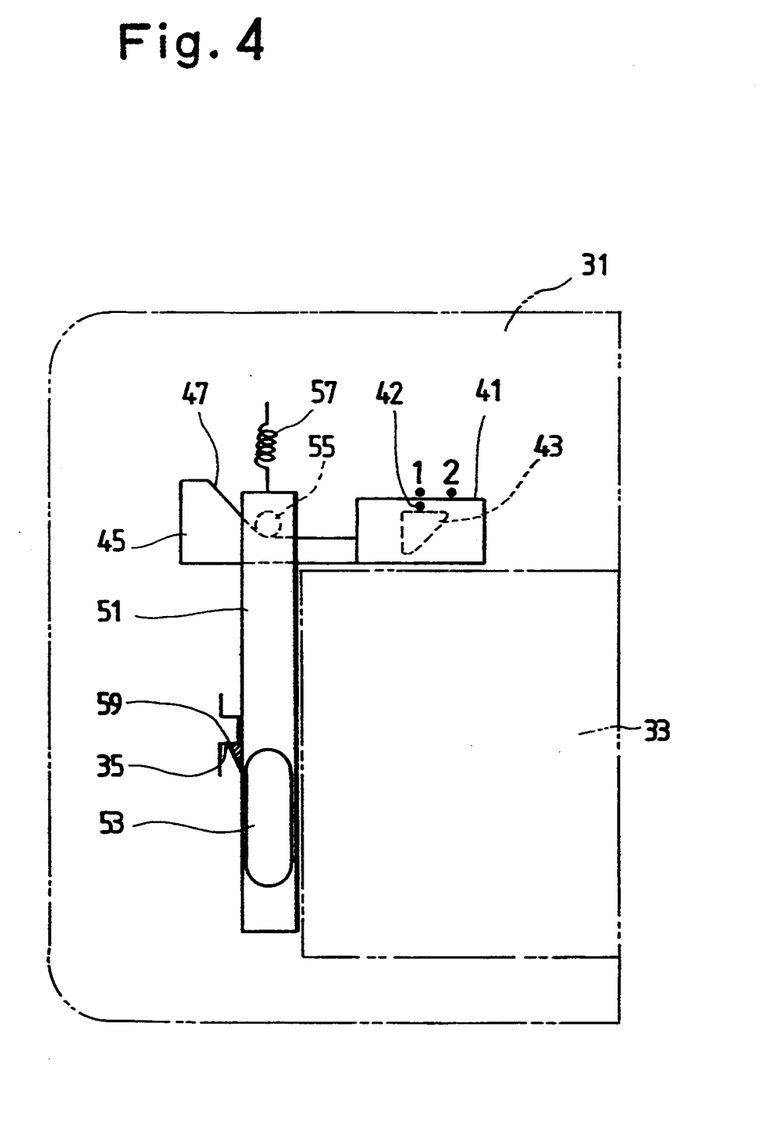
FIG. 4 is a back view of a main part of a camera having a light intercepting plate protecting apparatus, shown in an open position of a back cover of the camera, according to the present invention.

FIGS. 3 through 6 show an embodiment of a light intercepting plate protecting apparatus applied to a photographing aperture size changing apparatus according to the present invention. FIGS. 3 and 4 show back views of a light intercepting plate protecting apparatus when a back cover of the camera is open and closed, respectively.

In FIGS. 3 and 4, a slidable operation knob (handle) 41 to change the photographing aperture size is provided on the rear surface of the camera body 31 and above a back cover 33. The operation knob 41 is exposed to the outside, so that it can be actuated (slid) from the outside by an operator. The operation knob 41 has a mark (pointer) 42 which can be selectively registered with a position mark "1" or "2" provided on the camera body 31 when the operation knob 41 is slid and clickstopped by a click-stop mechanism (not shown) at a position "1" corresponding to the retracted photographing aperture or a position "2" corresponding to the panoramic-size photographing aperture, respectively. The number marks "1" and "2" can be replaced with symbols, figures, or letters, etc.

The operation handle 41 is provided with a photographing aperture size varying cam 43, an association lever 45 and a returning cam surface 47, which will be discussed in detail hereinafter. These elements, i.e., the photographing aperture size varying cam 43, the association lever 45 and the returning cam surface 47 are provided within the camera body and not exposed to the outside.

Figure 5:
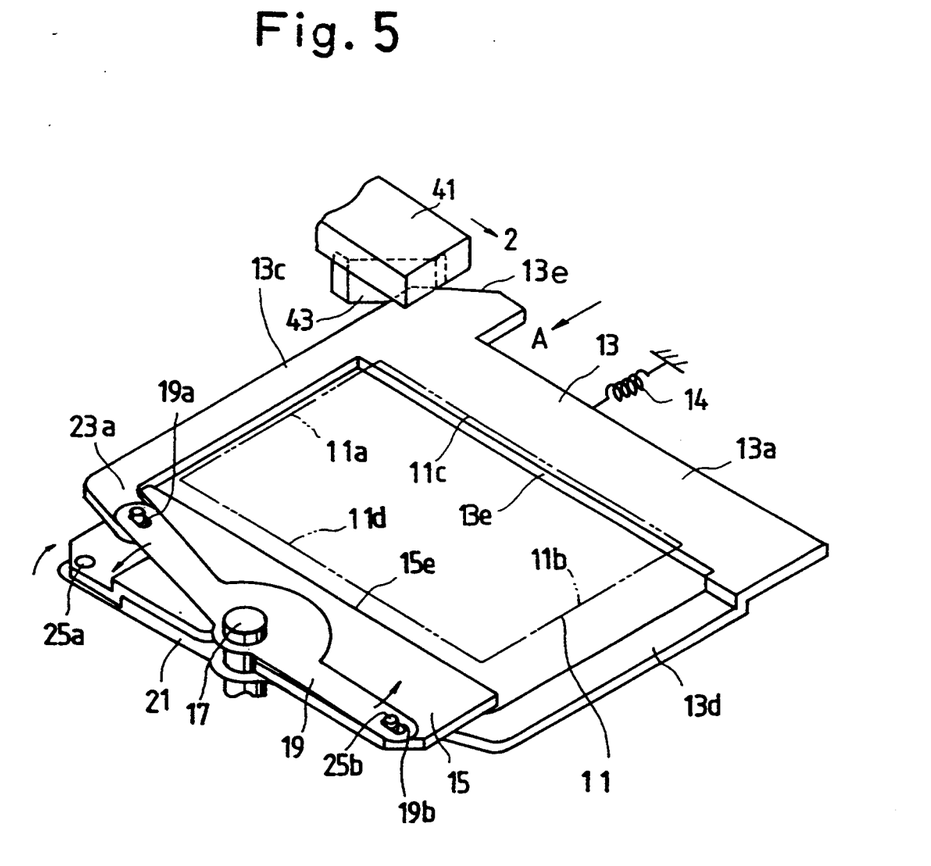
FIG. 5 is an isometric view of light intercepting plates in a photographing aperture size changing apparatus, shown in a retracted position, according to a second embodiment of the present invention; and, FIG. 6 is an isometric view of light intercepting plates in a photographing aperture size changing apparatus, shown in a panoramic-size position, according to a second embodiment of the present invention.
Figure 6:
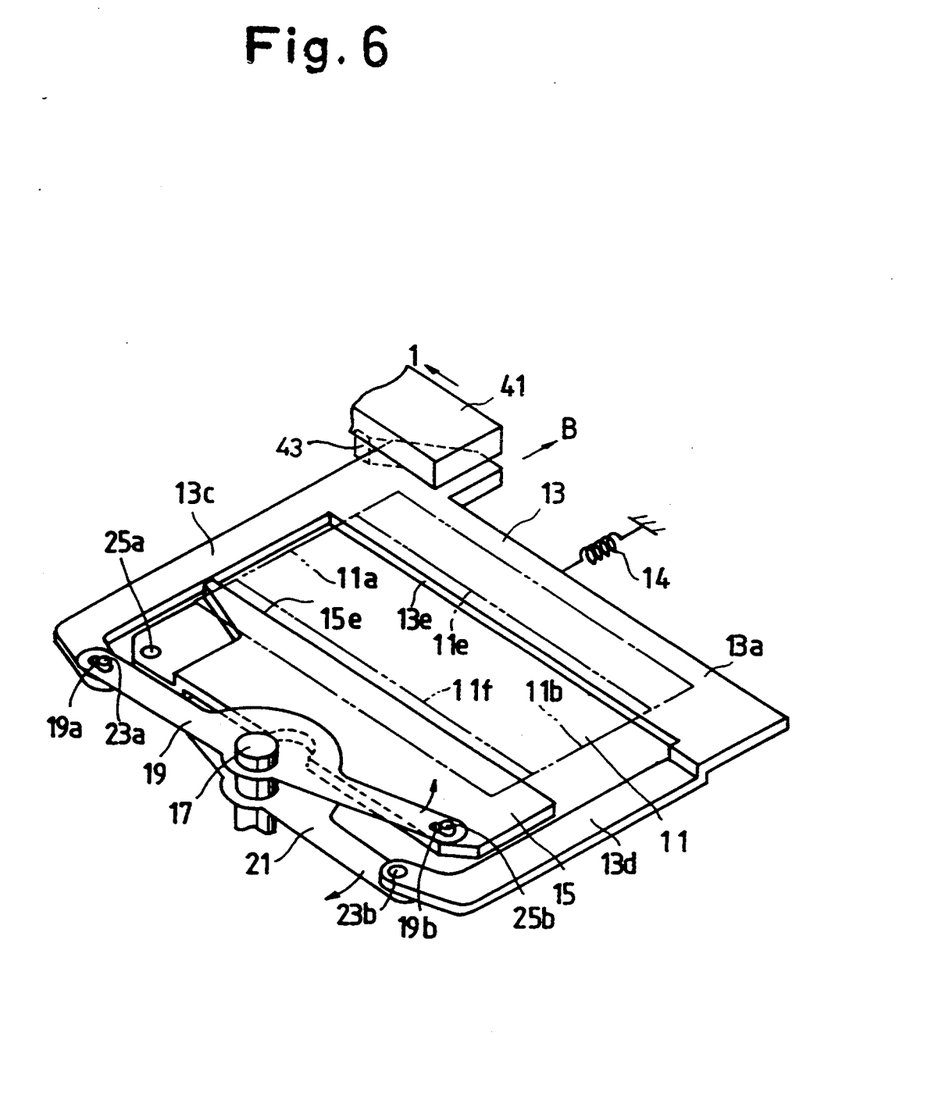

FIGS. 5 and 6 show an embodiment of a photographing aperture size changing apparatus which is actuated by the operation handle 41 shown in FIGS. 3 and 4. FIGS. 5 and 6, which are isometric views viewed from the back cover side, correspond to the retracted position and the panoramic-size position, respectively. The basic structure of the photographing aperture size changing apparatus shown in FIGS. 5 and 6 are substantially the same as that of FIGS. 1 and 2, and accordingly, the elements corresponding to those in FIGS. 1 and 2 are designated with like reference numerals and no detailed explanation thereof is given herein.

The first light intercepting plate 13 is provided on an upper-left end thereof with a cam projection 13e which comes into slide contact with the photographing aperture size varying cam 43 of the operation handle 41. The first light intercepting plate 13 is continuously biased towards the retracted position by a spring 14 provided on the camera body.

The operation handle 41 and the light intercepting plates 13 and 15 are associated with each other as follows:

When the operation handle 41 is slid from the retracted position towards the panoramic-size position, the cam 43 presses the cam projection 13e, so that the first light intercepting plate 13 is moved into the panoramic-size position against the spring 14 due to the slide contact between the cam 43 and the cam projection 13e. As a result, the first connecting rotatable plate 19 and the second connecting rotatable plate 21 are rotated in the C direction and the D direction, respectively, so that the second light intercepting plate 15 moves towards the first light intercepting plate 13. Consequently, the first and second light intercepting plates 13 and 15 partly block a predetermined area of the upper and lower edges of the aperture 11. Namely, the upper and lower edges of the aperture 11 are restricted by the opposed edges 13e and 15e of the first and second light intercepting plates 13 and 15. Thus, a panoramic-size photographic aperture defined by the aperture frames 11a, 11e, 11b and 11f is formed, as shown in FIG. 6.

When the operation handle 41 is slid from the panoramic size position shown in FIG. 6 towards the retracted position, the cam 43 is disengaged from the cam projection 13e, so that the first light intercepting plate 13 is immediately moved into the retracted position by the spring 14, since a stop to restrict the movement of the first light intercepting plate 13 no longer exists. As a result, the first and second light intercepting plates 13 and 15 move beyond the upper and lower edges 11c and 11d of the aperture 11 to fully open the aperture 11. Thus a retracted photographing aperture, as shown in FIG. 5 is again obtained.

The following discussion will be addressed to a light intercepting plate protecting apparatus which automatically moves or returns the first and second light intercepting plates 13 and 15 to the retracted position outside the aperture 11 to protect the same when the back cover 33 is opened.

A back cover opening lever 51 (FIGS. 3 and 4) is provided on the rear surface of the camera body 31 on the left side of the back cover 33 to open the latter. The back cover opening lever 51 is slidable in the vertical direction in FIGS. 3 and 4. The back cover opening lever 51 is provided, on an upper surface thereof, with a finger contact 53 which is exposed to the outside of the camera body 31, and on an upper end of a rear surface thereof, with a stop pin 55 which comes into contact with the returning cam surface 47 of the operation handle 41 to forcedly return the latter to the retracted position and prevent the operation handle 41 from moving to the panoramic-size position, respectively. The back cover opening lever 51 is also provided with an existing lock pin (not shown) which engages with an engaging pin (not shown) of the back cover 33 to lock the back cover 33 in a closed position. The back cover opening lever 51 is continuously biased upward (FIGS. 3 and 4) into the locked position by a spring 57 provided on the camera body 31.

When the back cover opening lever 51 is in the locked position (FIG. 3), the stop pin 55 is disengaged from the returning cam surface 47 to release the operation handle 41. Namely, the operation handle 41 can be moved either to the retracted position or the Panoramic-size position. On the other hand, when the back cover opening lever 51 is in the unlocked position (FIG. 4), the stop pin 55 engages with the returning cam surface 47 to move the operation handle 41 to the retracted Position and restrict a further movement therefrom. Namely, the operation handle 41 is prevented from moving to the panoramic-size position, so that no change to the Panoramic size of the photographing aperture takes place.

The back cover opening lever 51 has an engaging portion 59 which is engaged by an engaging portion 35 of the camera body 31 to hold the back cover opening lever 51 in the unlocked position against the spring 57. The engagement of the engaging portions 59 and 35 is broken by a releasing lever (not shown) of the back cover 33 when the latter is closed. The disengagement of the engaging portion 59 from the engaging portion 35 causes the back cover opening lever 51 to be moved to the locked position by the spring 57 to lock the back cover 33 in the closed position.

The back cover opening lever 51 and the photographing aperture size varying handle 41 are associated with each other as follows:

When the back cover opening lever 51 is manually moved to the unlocked position by a photographer, the locking mechanism of the back cover 33 is released, so that the back cover 33 can be opened. Consequently, the engaging portion 59 is engaged by the engaging portion 35 of the camera body 31, so that the back cover opening lever 51 is engaged in the unlocked position. During the movement of the back cover opening lever 51 into the unlocked position, the stop pin 55 comes into slide contact with the returning cam surface 47 to move the latter to the retracted position. Namely, even if the photographing aperture size varying handle 41 is in the panoramic-size position, it is forcedly returned to the retracted position, and no movement to the panoramic-size position occurs. As can be understood from the foregoing, when the back cover 33 is in an open position, since the photographing aperture size varying handle 41 is held in the retracted position and no movement thereof to the panoramic-size position can take place, neither the first light intercepting plate 13 nor the second light intercepting plate 15 come into the aperture 11. Thus, the light intercepting plates 13 and 15 can be prevented from being damaged or broken.

When the back cover 33 is closed, the engaging portion 35 is deformed by a lock pin (not shown) of the back cover 33 to disengage the engaging portion 59 from the engaging portion 35, so that the back cover opening lever 51 is moved to the locked position of the back cover by the spring 57 to lock the back cover 33. At the same time, the stop pin 55 is disengaged from the returning cam surface 47 to release the photographing aperture size varying handle 41. Consequently, the photographing aperture size varying handle 41 can be moved to the panoramic-size position, since the photographing aperture size varying handle 41 is free to move when the back cover 33 is closed.

As can be seen from the above discussion, according to the present invention, when the back cover opening lever 51 is moved in the unlocking direction, the operation handle 41 is forcedly moved to and locked in the retracted position owing to the engagement of the stop pin 55 and the returning cam surface 47. As a result, the light intercepting plates 13 and 15 are returned to the retracted position to fully open the aperture 11. Consequently, the light intercepting plates 13 and 15 do not appear in the aperture 11, and accordingly, no damage or breakage of the light intercepting plates 13 and 15 occurs due to an accidental contact of a photographer's finger or the like with the light intercepting plates.

It should be understood that the present invention is not limited to the illustrated embodiments. For example, the association mechanism of the operation handle and the photographing aperture size varying mechanism or the back cover opening lever can be replaced with, for example, a sliding crank mechanism. In an alternative, it is possible to drive the light intercepting plates by a motor. In such an alternative, the operation handle is actuated to make ON and OFF a motor driving switch.

As can be seen from the above discussion, according to the present invention, since the light intercepting plates which define the photographing aperture plane is automatically returned to the retracted position in association with the opening operation of the back cover, and is free to move to a restricted-size photographing aperture, such as a panoramic-size photographing aperture only when the back cover is in a closed position, there is no possibility that a photographer's finger or the like accidentally touches the light intercepting plates because they are retracted from the aperture. Moreover, it is not necessary to reinforce the light intercepting plates and/or the drive mechanism thereof, taking into account a damage or breakage thereof that would otherwise occur by an external force in the prior art, and accordingly, a thin and light photographing aperture size changing apparatus can be provided according to the present invention.

I claim:

1. An apparatus for changing a size of an aperture which defines a photographing aperture in a camera, comprising:
   a pair of light intercepting plates which can cover a predetermined area of end edges of the aperture to partly intercept light incident thereupon; and,
   an association mechanism which moves the light intercepting plates in association with each other between a retracted position in which the aperture is fully opened and a restricted-size position in which the aperture is partly covered,
   said association mechanism comprising a shaft secured to a camera body, and a connecting rotatable member which is rotatably mounted to the shaft, said connecting rotatable member comprising a pair of rotatable plates which are relatively rotatably mounted to said shaft in a superposed configuration, and connected at one end thereof to one of the light intercepting plates and at the other end thereof to the other light intercepting plate, receptively, so that the rotation of the connecting rotatable member causes the associated movement of the light intercepting plates between the retracted position and the restricted-size position, wherein one of the light intercepting plates is provided with association arms extending towards the other light intercepting plate, outside the aperture in the retracted position, so that one of opposite ends of one of the rotatable plates is connected to one of the association arms of one of the light intercepting plates, and the other end of one of the rotatable plates is connected to the other light intercepting plate, respectively, and one end of the other rotatable plate is connected to the other end of one of the light intercepting plates, and the other end of the other rotatable plate is connected to the other light intercepting plate, respectively.

2. An apparatus according to claim 1, wherein the pair of light intercepting plates lie and move in a same plane parallel with the picture plane to move away from and towards each other.

3. An apparatus according to claim 1, wherein the restricted size photographing aperture is a panoramic photographing aperture, a high-vision photographing aperture or a half-size photographing aperture.

4. An apparatus for protecting light intercepting plates in a photographing aperture size changing apparatus in a camera with a back cover, comprising;
   a pair of light intercepting plates which are movable between a retracted position in which an aperture of the camera is fully opened and a restricted-size position in which the aperture is partly restricted;
   a photographing aperture size changing mechanism which changes the size of a photographing aperture by movement of the light intercepting plates between the retracted position and the restricted-size position; and,
   a returning mechanism which drives the photographing aperture size changing mechanism to move the light intercepting plates to the retracted position in association with the movement of the back cover when the latter is opened.

5. An apparatus according to claim 4, further comprising a back cover opening lever which is moved between a locked position in which the back cover is locked and an unlocked position in which the back cover is unlocked.

6. An apparatus according to claim 5, wherein the returning mechanism comprises a cam mechanism which is associated with the back cover opening lever to move the photographing aperture size changing mechanism to the retracted position when the back cover opening lever is moved to the unlocked position.

7. An apparatus according to claim 6, further comprising a lock mechanism which locks the photographing aperture size changing mechanism in the retracted position when the back cover is opened.

8. An apparatus according to claim 7, wherein the photographing aperture size changing mechanism comprises a photographing aperture size varying operation handle which is slidable between positions corresponding to the retracted position and the restricted-size position.

9. An apparatus according to claim 8, further comprising a click-stop mechanism which stops the photographing aperture size varying operation handle at the positions corresponding to the retracted position and the restricted size position.

10. An apparatus according to claim 9, wherein the photographing aperture size varying operation handle is movable when the back cover is closed.

11. An apparatus according to claim 10, further comprising a biasing member for continuously biasing the photographing aperture size changing mechanism towards the retracted position.

12. An apparatus for changing a size of an aperture which defines a photographing aperture in a camera, comprising:
    a pair of light intercepting plates which can cover a predetermined area of end edges of the aperture to partly intercept light incident thereupon; and,
    an association mechanism which moves said light intercepting plates in association with each other between a retracted position in which the aperture is fully opened and a restricted-size position in which the aperture is partly covered,
    wherein said association mechanism comprises a shaft secured to a camera body, and a connecting rotatably member which is rotatably mounted to said shaft, and said connecting rotatable member comprises a pair of rotatable plates each having opposite ends;
    wherein one of said pair of light intercepting plates is provided with association arms extending towards the other of said pair of light intercepting plates, outside the aperture in the retracted position, so that one of said opposite ends of one of said rotatable plates is connected to one of said association arms, and the other of said opposite ends of said one of said rotatable plates is connected to the other of said pair of intercepting plates, so that the rotation of said connecting rotatable member causes associated movement of said light intercepting plates between the retracted position and the restricted-size position.

13. An apparatus according to claim 12, wherein said rotatable plates are relatively rotatably mounted to said shaft in a superimposed configuration.

14. An apparatus according to claim 12, wherein one end of the other of said pair of rotatable plates is connected to the other end of said one of said pair of light intercepting plates, and the other end of the other of said pair of rotatable plates is connected to the other of said pair of light intercepting plates.

15. An apparatus according to claim 12, wherein said pair of light intercepting plates lie and move in a plane parallel with the picture plane during movement towards and away from each other.

16. An apparatus according to claim 12, wherein the restricted size photographing aperture is a panoramic photographing aperture, a high-vision photographing aperture or a half-size photographing aperture.

* * * * *